G. S. STURGES.
AUTOMOBILE SEAT.
APPLICATION FILED JULY 14, 1913.

1,151,910.

Patented Aug. 31, 1915.

WITNESSES:

INVENTOR.
George S. Sturges
BY
ATTORNEY

UNITED STATES PATENT OFFICE.

GEORGE S. STURGES, OF SAN FRANCISCO, CALIFORNIA.

AUTOMOBILE-SEAT.

1,151,910.  Specification of Letters Patent.  Patented Aug. 31, 1915.

Application filed July 14, 1913. Serial No. 778,926.

*To all whom it may concern:*

Be it known that I, GEORGE S. STURGES, a citizen of the United States, residing at San Francisco, in the county of San Francisco and State of California, have invented new and useful Improvements in Automobile-Seats, of which the following is a specification.

In vehicles as automobiles which travel very rapidly, the vertical vibration, caused by even a comparatively small obstruction in the road, is excessive on account of the speed at which the vehicle is moving. To reduce the discomfort which would otherwise be caused by such vibration there have been employed, so far as I am aware, springs located only in two positions, one position between the wheel axles and the body of the vehicle, and the other position being in the bottom of the seats for the occupants. Springs of the first kind, since they have to support the whole weight of the body of the car, are necessarily made very strong and heavy and cannot therefore respond with sufficient rapidity to the successive jars which are experienced by the car in its movement. To further protect the riders from this shock or jar, the bottoms of the seats have cushions of unusual depth, having springs therein capable of great reciprocation. But the provision of such springs does not entirely remove the discomfort occasioned by the jolting and vibration of the car. There still remains a source of great discomfort, which is only aggravated by making the seats still more resilient. Every time a person sitting on such an extremely resilient seat bounces up and down with the jolting of the car, his back rubs with great violence against the back of the seat. To avoid this, it is true that, when the car is traveling very fast, or meets rough places in the road, the occupants of a car will generally sit forward, so that their backs do not come in contact with the back of the seat. But this is also objectionable because they then have to ride in an uncomfortable position, with no lateral support whatever. Furthermore every time a rider sitting at the end of a seat goes up with the reciprocation of the car his arm leaves the arm of the seat, and every time he comes down his arm strikes the arm of the seat.

The object of the present invention is to avoid these discomforts.

Figure 1:
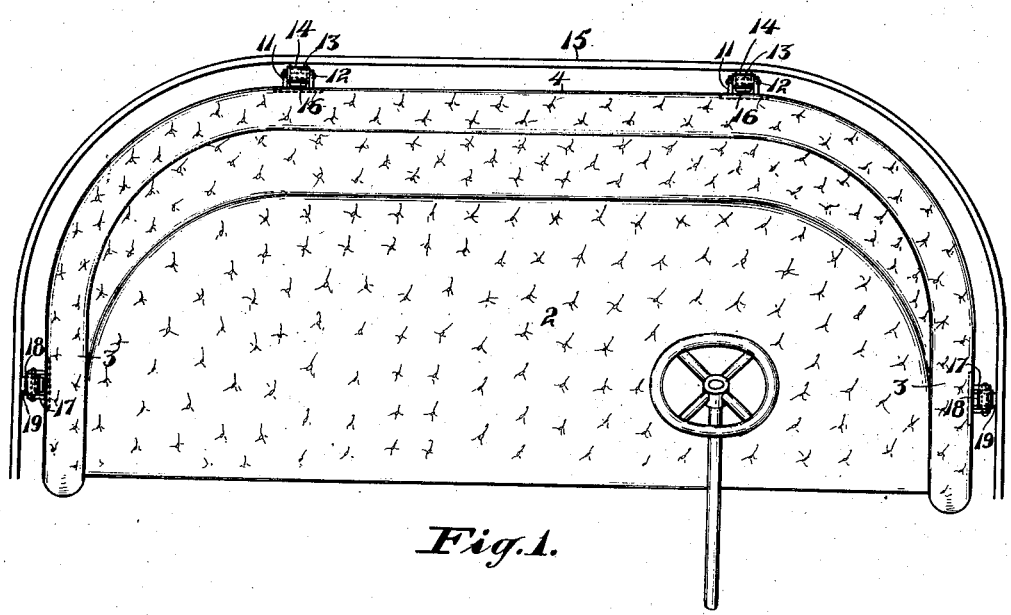
Figure 2:
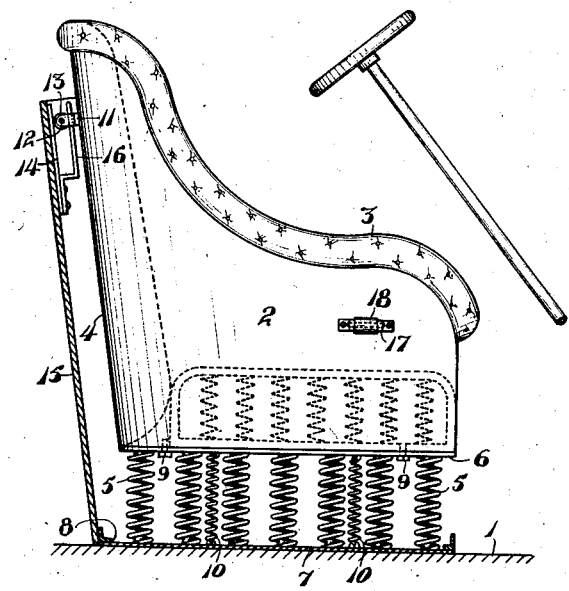

In the accompanying drawing, Figure 1 is a top plan view of a portion of an automobile equipped with my improvement; Fig. 2 is a vertical section thereof.

Referring to the drawing, 1 indicates a portion of the body of an automobile and 2 a seat therein. Instead of securing the seat 2 to said body rigidly and relying upon the springs of the bottom of the seat for avoiding the shocks or jars which are caused by rapid traveling on uneven roads, I now support the entire seat, including the arms 3 and the back 4, upon springs 5 which are supported at the bottom upon the body 1 of the car. Said springs 5 rest between upper and lower plates 6, 7, the rear end of the lower plate 7 of which can be received within a transverse groove 8 formed in the car body, while the upper plate 6 is secured by bolts 9 to the bottom of the seat 2. Said plates 6 and 7 are connected together by light springs 10, which limit the extent of separation of said plates. On the back of the seat near the top are secured brackets 11, in which is pivoted a shaft 12 carrying a roller 13 which rolls between a vertical plate 14 secured to an upwardly extending wall or false back 15 rigidly secured to the body of the car, and a front plate 16 spaced from the rear plate 14 at its upper portion, and extending close to said plate at its lower portion, and rigidly secured thereto by rivets. Upon the ends of the seat are secured bearing blocks 17 for rollers 18 which roll against end walls 19 running parallel with the arms 3 of the seat. The bottom of the seat is provided with the usual springs for cushioning the bottom of stationary seats.

It will be seen that the discomfort occasioned by the rubbing of the back of the rider against the back of the seat in its reciprocation due to the motion of the car over rough roads or at a high speed over obstacles, as well as the discomfort occasioned by the striking of his arm against the arm of the seat, are now avoided, since the arms and back of the seat reciprocate with the rider himself.

I claim:—

1. In combination with the body of a vehicle, a seat having a back, springs for supporting the seat and back upon said body, means for confining said seat to a reciprocating and substantially vertical movement relative to said body, and anti-friction rollers arranged to reduce the frictional resistance to said reciprocating movement.

2. In combination with the body of a vehicle, a seat having a back, springs for supporting the seat and back upon said body, said body having a wall parallel with the back of said seat, means interposed between said wall and back for guiding the back in a reciprocating and substantially vertical movement, and rollers arranged to reduce the frictional resistance to said vertical movement.

3. In combination with the body of a vehicle, a seat having a back and arms, springs for supporting the seat, back and arms upon said body, said body having walls parallel with the back and arms of said seat, means interposed between said walls and back and arms respectively for guiding the back and arms in invariable vertical paths relative to said walls.

4. In combination with the body of a vehicle, a seat having a back and arms, springs for supporting the seat, back and arms upon said body, said body having walls parallel with the back and arms of said seat, means interposed between said walls and back and arms respectively for guiding the back and arms in the vertical movement of the seat, and rollers arranged to reduce the frictional resistance to said guiding movement.

In testimony whereof I have hereunto set my hand in the presence of two subscribing witnesses.

GEORGE S. STURGES.

Witnesses:
F. M. WRIGHT,
D. B. RICHARDS.